(12) United States Patent
Thorne et al.

(10) Patent No.: US 6,643,710 B1
(45) Date of Patent: *Nov. 4, 2003

(54) ARCHITECTURE TO FRAGMENT TRANSMITTED TCP PACKETS TO A REQUESTED WINDOW SIZE

(75) Inventors: Leslie Thorne, San Jose, CA (US); Glen H. Lowe, Union City, CA (US); Gary Takashi, Milpitas, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/398,351

(22) Filed: Sep. 17, 1999

(51) Int. Cl.[7] ............................................. G06F 15/16
(52) U.S. Cl. ........................ 709/250; 709/230; 709/225
(58) Field of Search ................................. 709/245, 230, 709/250, 225; 370/474, 389; 710/23

(56) References Cited

U.S. PATENT DOCUMENTS

| | | | | |
|---|---|---|---|---|
| 6,112,247 A | * | 8/2000 | Williams | 709/236 |
| 6,119,171 A | * | 9/2000 | Alkhatib | 709/245 |
| 6,172,990 B1 | * | 1/2001 | Deb et al. | 370/474 |
| 6,219,697 B1 | * | 4/2001 | Lawande et al. | 709/221 |
| 6,289,012 B1 | * | 9/2001 | Harrington et al. | 370/389 |
| 6,304,910 B1 | * | 10/2001 | Roach et al. | 709/236 |
| 6,330,614 B1 | * | 12/2001 | Aggarwal et al. | 709/236 |
| 6,347,347 B1 | * | 2/2002 | Brown et al. | 710/23 |

* cited by examiner

Primary Examiner—Zarni Maung
Assistant Examiner—Jungwon Chang
(74) Attorney, Agent, or Firm—Wagner, Murabito & Hao LLP (57) ABSTRACT

Architecture to fragment transmitted transmission control protocol (TCP) packets to a requested window size. Specifically, one embodiment of the present invention includes a method for implementing transmission control protocol segmentation within hardware. The method includes the hardware, implemented step of downloading a payload header of a data payload stored within memory of a host device. Furthermore, the method also includes the hardware implemented step of downloading a plurality of data segments of the data payload. Additionally, the method includes the hardware implemented step of repeatedly modifying the payload header in order to generate a plurality of frame headers which correspond to the plurality of data segments.

30 Claims, 3 Drawing Sheets

ARCHITECTURE TO FRAGMENT TRANSMITTED TCP PACKETS TO A REQUESTED WINDOW SIZE

TECHNICAL FIELD

The present invention generally relates to the field of computer networking. More particularly, the present invention relates to the field of Transmission Control Protocol (TCP) segmentation for a network interface card.

BACKGROUND ART

Computers have become an integral tool used in a wide variety of different applications, such as in finance and commercial transactions, computer-aided design and manufacturing, health care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via electronic mail (e-mail) and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a network interface card (NIC). Essentially, the NIC works with the operating system and central processing unit (CPU) of the host computer to control the flow of information over the LAN. Some NICs may also be used to connect a computer to the Internet.

Typically, NICs are also used to communicate over a LAN communications network standard referred to as Ethernet. When large amounts of data or data files are transmitted using Ethernet, a Transmission Control Protocol (TCP) segmentation process is typically run on a central processor unit (CPU) of a host computer in order to break the data down into transmission frames. For example, Ethernet has a maximum transmission frame size of 1514 bytes. Of the 1514 bytes of the transmission frame, there are a lot of bytes which are used for overhead. For instance, some bytes are used for addressing, other bytes are used for header information, etc. As such, the bytes remaining for the actual payload of data within each transmission frame are considerably less (e.g., 1460 bytes) than the 1514 bytes. It should be appreciated that there are disadvantages associated with this prior art process of segmenting data for transmission over a network.

One of the main disadvantages of this prior art segmentation process occurs as Ethernet network speed becomes ever faster (e.g., gigabit levels). At these high network speeds, the TCP segmentation process performed by the processor of the host computer becomes a bottleneck of the critical performance path, thereby slowing down the data throughput of the NIC. In other words, the processor becomes a bottleneck for data throughput of the NIC when used at high network speeds.

One of the prior art solutions for improving the throughput of the NIC is to implement an embedded processor onto the NIC in order to specifically perform the TCP segmentation process. In this manner, a large majority of the segmentation process is removed from the processor of the host computer and moved onto the embedded processor of the NIC. This prior art solution does improve the throughput of the NIC, but there are disadvantages associated with this prior art solution.

One of the main disadvantages of this prior art solution is that it does not effectively solve the problem of data throughput of a NIC when used with high speed networks (e.g., gigabit levels). Basically, the embedded processor of the NIC now becomes the bottleneck of the critical performance path thereby slowing down the data throughput of the NIC. In other words, the bottleneck for data throughput of the NIC is moved from the host processor to the embedded processor of the NIC.

Accordingly, a need exists for a method and system for providing significantly improved data throughput of a network interface card which is used with a high speed network (e.g., gigabit levels).

DISCLOSURE OF THE INVENTION

Embodiments of the present invention provide a method and system for providing significantly improved data throughput of a network connection which is used with a high speed network (e.g., gigabit levels). Specifically, one embodiment of the present invention includes a method for implementing transmission control protocol (TCP) segmentation within hardware. The method includes the hardware implemented action of receiving a descriptor from a host device for a data payload stored within host memory to be transmitted over a network. The method also includes the hardware implemented action of utilizing the descriptor to download payload header data of the data payload from the host memory. Furthermore, the method also includes the hardware implemented action of downloading a plurality of data segments of the data payload. Additionally, the method includes the hardware implemented action of repeatedly modifying the payload header data in order to generate a plurality of frame headers which correspond to the plurality of data segments.

In another embodiment, the present invention includes a circuit for implementing transmission control protocol segmentation on a data payload to be transmitted over a network. The circuit includes a first circuit portion coupled to receive a descriptor from a host device for the data payload stored within a host memory to be transmitted over the network. As part of the transmission control protocol segmentation the first circuit portion uses the descriptor to request download of payload header data and data segments of the data payload from the host memory. Additionally, the circuit includes a second circuit portion coupled to receive the payload header data and data segments of the data payload from the host memory. The second circuit portion repeatedly modifies the payload header data to generate frame headers which correspond to said data segments.

In still another embodiment, the present invention includes a system for implementing transmission control protocol segmentation. The system includes a host device which includes a host memory. Additionally, the system includes a circuit for implementing transmission control protocol segmentation. The circuit includes a first circuit portion coupled to receive a plurality of data segments of a data payload stored within the host memory. Moreover, the circuit includes a second circuit portion coupled to receive payload header data of the data payload. It should be appreciated that the second circuit portion repeatedly modifies the payload header data in order to generate a plurality of frame headers which correspond to the plurality of data segments.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "downloading", "modifying", "organizing", "transmitting", "determining", "receiving", "using" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

Figure 1:
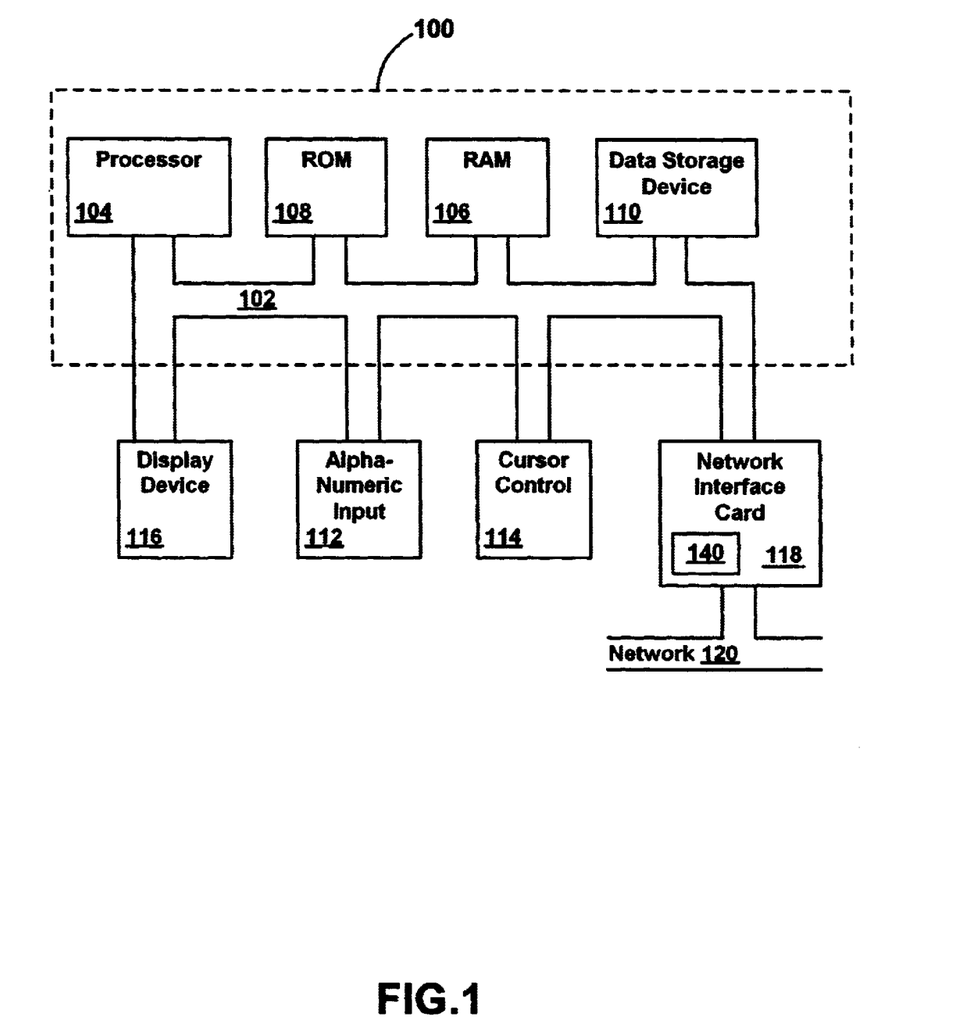
FIG. 1 is a schematic diagram of an exemplary computer system used to perform steps of the present method in accordance with one embodiment of the present invention.

With reference now to FIG. 1, portions of the present method and system are comprised of computer-readable and computer-executable instructions which reside, for example, in computer-usable media of a computer system. FIG. 1 illustrates an exemplary computer system 100 used to perform the present invention. It is appreciated that system 100 of FIG. 1 is exemplary only and that the present invention can operate within a number of different computer systems including general purpose networked computer systems, embedded computer systems, and stand alone computer systems. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. Central processor unit 104 may be an 80x86-family microprocessor or any other type of processor. System 100 also includes data storage features such as a computer usable volatile memory 106 (e.g., random access memory, static RAM, dynamic RAM, etc.) coupled to bus 102 for storing information and instructions for central processor unit 104, computer usable non-volatile memory 108 (e.g., read only memory, programmable ROM, flash memory, EPROM, EEPROM, etc.) coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112, which includes alphanumeric and function keys, is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a mouse, trackball, touch pad, joystick or special keys on alphanumeric input device 112 capable of signaling movement of a given direction or manner of displacement. Alternatively, it is appreciated that a cursor can be directed and/or activated via input from alphanumeric input device 112 using special keys and key sequence commands. The present invention is also well suited to directing a cursor by other means such as, for example, voice commands. A more detailed discussion of the method and system embodiments of the present invention are found below.

With reference still to FIG. 1, significantly, a network interface card (NIC) 118 coupled to bus 102 is connected to a network 120 and controls the flow of information of computer system 100 over network 120. Data packets, such as Ethernet packets, that are incoming and outgoing via network 120 are transmitted and received by a medium access control (MAC) circuit 140 of NIC 118. A more detailed discussion of NIC 118 in furtherance of the present invention is found below.

Detailed Description of the Structure and Operation of the Present Invention

In the following description of embodiments of the present invention, the network interface card is a peripheral component. Although the present embodiments specifically recite a network interface card, the present invention is also well suited to an embodiment employing various other peripheral components. That is, the present invention is well suited to an embodiment in which the peripheral component is, for example, a PCMCIA (personal computer memory card international association) card. Similarly, the present invention is well suited to an embodiment in which the peripheral component is, for example, a compact form factor I/O (input/output) card. Additionally, the present invention is well suited to use in an embodiment in which the peripheral component is, for example, a rate controller, a small computer system interface (SCSI) controller, a graphics card, and the like. Furthermore, the present invention is well suited to be use, for example, in a non-peripheral component environment such as an application specific integrated circuit (ASIC) disposed on a motherboard, an embedded circuit, and the like.

Figure 2:
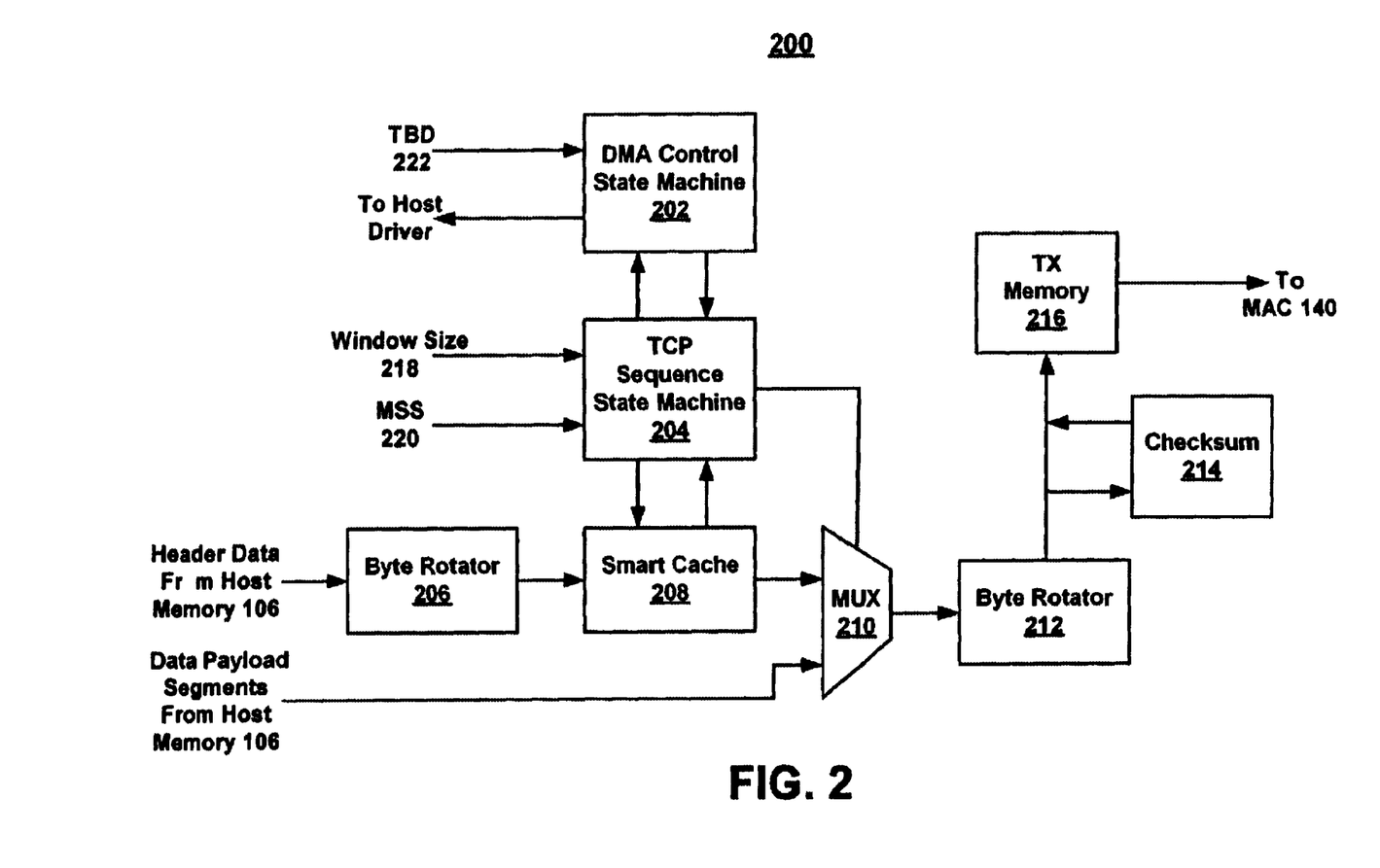
FIG. 2 is a schematic block diagram of a segmentation circuit in accordance with one embodiment of the present invention, which is disposed on a network interface card.

With reference now to FIG. 2, which is a schematic block diagram of a segmentation circuit 200 in accordance with one embodiment of the present invention, which is disposed on network interface card 118. One of the main purposes of the different hardware components of segmentation circuit 200 of the present embodiment is to perform the sending or transmission side of the transmission control protocol (TCP) segmentation process. In this manner, the sending side of the TCP segmentation process is off-loaded from processor 104 of computer system 100, thereby significantly reducing its segmentation process utilization and allowing processor 104 to be utilized for other processes. Furthermore, in this fashion, the data throughput of network interface card 118 is able to function at high wire speeds (e.g., gigabit levels).

Basically, during the TCP segmentation process of a particular data payload stored within host memory 106, the payload header is only downloaded once from host device 100 and stored within a smart cache circuit 208. Furthermore, a DMA control state machine 202 and a TCP sequence state machine 204 of the present embodiment operate in conjunction to specifically download data segments of the data payload from host device 100. Additionally, as each data segment is downloaded from host device 100, smart cache 208 generates a corresponding frame header by modifying specific fields of the payload header. Within the present embodiment, the multiple frame headers and multiple data segments are organized in order to form multiple Ethernet frames. In this manner, the present embodiment performs a TCP segmentation process on the data payload stored within host device 100.

Specifically, a host driver (not shown) running on processor 104 of host system 100 is responsible for creating a transmit buffer descriptor (TBD) for a data payload stored within host memory 106 which is to be eventually transmitted by network interface card (NIC) 118 over network 120. The transmit buffer descriptor includes information about where the data payload is specifically stored within host memory 106, the window size of the data payload, the maximum segment size (MSS), along with other information. Furthermore, the host driver prepares a list of these transmit buffer descriptors and makes them available to NIC 118, where they are stored temporarily within a cache (not shown). A direct memory access (DMA) control state machine circuit 202 of FIG. 2 is coupled to receive the transmit buffer descriptors 222 from the cache where they are temporarily stored.

Upon receiving a transmit buffer descriptor 222, DMA control state machine circuit 202 of the present embodiment determines whether the data payload stored within host memory 106, corresponding to transmit buffer descriptors 222, needs to be TCP segmented into Ethernet frames. It should be appreciated that one of the fields within transmit buffer descriptor 222 contains a large send bit. If the large send bit is not asserted (e.g., zero volts), DMA control state machine 202 determines that the data payload does not need to be TCP segmented into Ethernet frames. Conversely, DMA control state machine 202 determines that the data payload needs to be TCP segmented into Ethernet frames when the large send bit is asserted (e.g., 1 volt). It is appreciated that segmentation circuit 200 operates differently depending on whether the data payload needs to be TCP segmented into Ethernet frames. As such, the following detailed description will first describe TCP segmentation of the data payload by segmentation circuit 200 followed by a description of its operation during non TCP segmentation transmissions.

Upon determining that the data payload needs to be TCP segmented into Ethernet frames, DMA control state machine 202 of FIG. 2 enters TCP segmentation mode and becomes a slave device to a TCP sequence state machine circuit 204. In other words, during TCP segmentation operations, TCP sequence state machine 204 controls the manner in which the data payload is downloaded from host memory 106. It is appreciated that TCP sequence state machine circuit 204 is coupled to DMA control state machine 202. From transmit buffer descriptor 222, TCP sequence state machine 204 receives a window size signal 218 and a MSS signal 220. It should be appreciated that window size signal 218 indicates the total size of the data payload to be transmitted by NIC 118 over network 120 while MSS signal 220 indicates the maximum segment size of payload data which can be contained within a single Ethernet frame. Upon receiving the above information, TCP sequence state machine 204 transmits a header download signal to DMA control state machine 202 directing it to request download of the header from host device 100 which corresponds to the data payload stored within host memory 106.

It should be appreciated that there are four different types of Ethernet encapsulations which segmentation circuit 200 is able to segment into Ethernet frames. Specifically, the types of Ethernet encapsulations include Ethertype (ETYPE), subnet access protocol (SNAP), virtual local area network Ethertype (VLAN-ETYPE), and virtual local area network subnet access protocol (VLAN-SNAP). It should be further appreciated that each type of these encapsulations utilizes a different number of bytes for its corresponding header. That is, ETYPE uses 54 bytes for its header, VLAN-ETYPE uses 58 bytes, SNAP uses 62 bytes, and VLAN-SNAP uses 66 bytes. Furthermore, since segmentation circuit 200 does not know the specific type of encapsulation of the data payload stored within host memory 106, the present embodiment requests the download of the largest size header, which is the first 66 bytes of the data payload. It should be appreciated that the present embodiment is well suited to operate on many different types of data encapsulations.

With reference still to FIG. 2, in response to receiving the header download signal from TCP sequence state machine 204, DMA control state machine 202 transmits a download request signal to the host driver running on processor 104 of host device 100 specifically requesting download of the first 66 bytes of the data payload. Consequently, host device 100 downloads the first 66 bytes of the data payload to a byte rotator circuit 206 of segmentation circuit 200. Byte rotator circuit 206 receives the first 66 bytes and shifts the data around in order to properly align them for reception by a smart cache circuit 208, which is coupled to byte rotator circuit 206. It is appreciated that the functionality of a byte rotator circuit is well known by those ordinary skill in the art. Subsequently, byte rotator circuit 206 transmits the properly aligned first 66 bytes of the data payload to smart cache 208.

Upon receiving the aligned first 66 bytes of the data payload, smart cache 208 determines its type of encapsulation by reading the type field of the header. Smart cache 208 is coupled to TCP sequence state machine 204. As such, smart cache 208 transmits a header type signal to TCP sequence state machine 204 indicating the type of header encapsulation of the data payload. Furthermore, after determining the type of encapsulation of the header, smart cache 208 is able to identify the different fields contained within the header and channel those fields into different specific memory locations for storage and later manipulation. Depending on the type of encapsulation of the header, the downloaded first 66 bytes of the data payload may contain both header data and payload data. For example, if the header encapsulation is ETYPE, then 54 bytes of the downloaded 66 bytes are header data while the other 12 bytes are payload data. As such, smart cache 208 would store the 12 bytes of payload data separately. Once the header fields and any extra payload data are stored, smart cache 208 modifies the data contained within specific header fields (e.g., internet protocol (IP) length, TCP sequence number, IP sequence number, and the like) in order to generate a first frame header for a corresponding first Ethernet frame segment. It should be appreciated that the first frame header will also correspond to a data payload segment subsequently used to form the first Ethernet frame segment. It is appreciated that the header fields which are modified by smart cache 208 in order to generate frame headers for corresponding Ethernet frames during TCP segmentation process are well known by those of ordinary skill in the art. Smart cache 208 is coupled to multiplexer (MUX) 210. Subsequently, smart cache 208 outputs a copy of the multiple fields which comprise the first frame header along with any extra payload data to MUX 210.

Within the present embodiment, the payload header of a particular data payload is only downloaded once from host device 100 and stored within smart cache 208. Subsequently, the header data is repeatedly modified by smart cache 208 in order to generate multiple frame headers which correspond to subsequent downloaded data segments of the data payload. It should be appreciated that the present embodiment can generate more or less frame headers than data segments.

TCP sequence state machine 204 of FIG. 2 is coupled to MUX 210 in order to control its operation. As such, upon receiving the header type signal from smart cache 208, TCP sequence state machine 204 outputs a high signal (e.g., 1 volt) to MUX 210. The high signal causes MUX 210 to allow the multiple data fields of the first frame header and any extra payload data output by smart cache 208 to pass through it and be received by a byte rotator circuit 212, which is coupled to MUX 210. Byte rotator circuit 212 receives the multiple data fields of the first frame header along with any extra payload data and shifts the data around in order to properly align it for reception by a transmit (TX) memory device 216 and a checksum circuit 214. As previously mentioned, the functionality of a byte rotator circuit is well known by those ordinary skill in the art. Byte rotator 212 is coupled to checksum circuit 214 and TX memory device 216. Subsequently, byte rotator circuit 212 transmits the properly aligned first frame header along with any extra payload data to TX memory device 216 and checksum circuit 214.

Checksum circuit 214 is used within the present embodiment for providing a process of error detection for a receiver device coupled to network 120, which eventually receives the data payload transmitted by NIC 118. It should be appreciated that the process of checksumming is well known by those of ordinary skill in the art. Specifically, checksum circuit 214 of the present embodiment views the received data stream from byte rotator circuit 212 as a specific number of bit integers, which it sums. Furthermore, a checksum is calculated on the frame headers and payload data. For example, an IP checksum is calculated on each IP header and a TCP checksum is calculated on each TCP header along with its corresponding payload data. Once calculated, the checksums are placed into specific fields, which are transmitted to TX memory device 216. Checksum circuit 214 is coupled between byte rotator circuit 212 and TX memory device 216. It is appreciated that TX memory device 216 of the present embodiment receives the data from checksum circuit 214 and the properly aligned first frame header along with any extra payload data from byte rotator circuit 212 and temporarily stores them.

After the smart cache 208 of FIG. 2 modifies the fields of the first frame header and sends it to TX memory device 216, TCP sequence state machine 204 transmits a download MSS payload signal to DMA control state machine 202 directing it to request a download of a MSS length portion of the data payload from host device 100 which will be used to form the first Ethernet frame segment. It should be appreciated that TCP sequence state machine 204 of the present embodiment is not concerned with the details of how many bytes of payload data are downloaded from host memory 106. Instead, that is one of the functions of DMA control state machine 202. Therefore, DMA control state machine 202 performs most of the calculations of the number of bytes to request to be downloaded from host memory 106. In this manner, DMA control state machine 202 segments the payload data stored within host memory 106.

Specifically, as part of its functionality, DMA control state machine 202 keeps an accumulated total of the amount of bytes of a particular data payload it has requested to be downloaded from host device 100. In this manner, DMA control state machine 202 is able to determine when all of the payload data has been downloaded from host device 100. Furthermore, as specific bytes are requested to be downloaded from host device 100, DMA control state machine 202 also advances an address pointer corresponding to the location of the data payload within host memory 106 which has not yet been downloaded. In this fashion, DMA control state machine 202 is able to request download of specific memory locations containing payload data within host memory 106.

Additionally, during requests for payload data downloads, DMA control state machine 202 of FIG. 2 also determines how much payload data to download by comparing the length of the data payload remaining to be downloaded to the MSS length. Specifically, if the MSS length is less than or equal to the remaining length of the data payload to be downloaded, DMA control state machine 202 requests that the MSS length of bytes be downloaded to MUX 210. If the MSS length is more than the remaining length of the data payload to be downloaded, DMA control state machine 202 requests that the remaining length of the data payload be downloaded to MUX 210. It is appreciated that if the latter situation is true, it is an indication that the data payload will have been completely downloaded to segmentation circuit 200.

It is important to understand that for the next download request, DMA control state machine 202 of the present embodiment performs an additional determination. Specifically, DMA control state machine 202 determines how much additional data payload (non-header data) should be requested to be downloaded from host device 100 in order to form the first Ethernet frame segment. For purposes of clarity, this segment of data payload will be referred to as a first data payload segment. For this download request, the determination by DMA control state machine 202 of the length of the first data payload segment is based on the particular header encapsulation of the data payload.

For example, if the header encapsulation is ETYPE, the header contains 54 bytes. And since the first 66 bytes of the data payload have been downloaded from host device 100, there are 54 bytes of header data and 12 bytes of actual data payload (non-header data) stored within TX memory device 216, as described above. Since 12 bytes of the data payload have already been downloaded and stored within TX memory 216, DMA control state machine 202 needs to determine how much additional data payload it should request to be downloaded in order to completely form the first Ethernet frame segment. Therefore, DMA control state machine 202 determines the download request length of the first data payload segment by subtracting the amount of extra payload data bytes (e.g., 12 bytes) already downloaded into smart cache 208 from the MSS length. Once the download request length is determined, DMA control state machine 202 transmits a download request signal to the host driver running on processor 104 requesting download of the determined length of the first data payload segment. Subsequently, host device 100 downloads the determined length of the first data payload segment to MUX 210.

With reference still to FIG. 2, once the copy of the first frame header passes through MUX 210, TCP sequence state machine 204 outputs a low signal (e.g., zero volts) to MUX 210. The low signal causes MUX 210 to allow the first data payload segment of the data payload to pass through it and be received by byte rotator circuit 212. As mentioned above, byte rotator 212 receives the first data payload segment of the data payload and shifts the data around in order to properly align it for reception by TX memory device 216 and checksum circuit 214. Subsequently, byte rotator circuit 212 transmits the properly aligned first data payload segment of the data payload to TX memory device 216 and checksum circuit 214. Checksum circuit 214 operates on the first data payload segment of the data payload in the same manner as described above. It is appreciated that TX memory device 216 of the present embodiment receives the data from checksum circuit 214 and the properly aligned first data payload segment of the data payload from byte rotator circuit 212 and temporarily stores them. It should be further appreciated that once this data is stored within TX memory device 216 along with the first frame header and any extra payload data, it results in the formation of the first Ethernet frame segment.

Within the present embodiment, the formation of subsequent Ethernet frame segments are similar to the formation of the first Ethernet frame segment described above. Specifically, TCP sequence state machine 204 transmits a modify signal to smart cache 208 indicating when to modify the data within specific header fields. Upon reception of the modify signal, smart cache 208 modifies the stored data contained within specific header fields (e.g., IP length, TCP sequence number, IP sequence number, and the like) in order to generate a second frame header for a corresponding second Ethernet frame segment. It should be appreciated that the second frame header will also correspond to a data payload segment subsequently used to form the second Ethernet frame segment. It is appreciated that the header fields which are modified by smart cache 208 in order to generate frame headers for corresponding Ethernet frames during TCP segmentation process are well known by those of ordinary skill in the art. Subsequently, smart cache 208 outputs to MUX 210 a copy of the multiple fields which comprise the second frame header. TCP sequence state machine 204 causes MUX 210 to allow the second frame header to pass through it and be received by byte rotator 212. The operation of byte rotator 212, checksum circuit 214, and TX memory device 216 on the second frame header are similar to their operation on the first frame header, described above.

It should be appreciated that smart cache 208 is able to modify the appropriate stored header fields in one clock cycle. As such, smart cache 208 is able to modify the appropriate stored header fields and output a frame header between downloads from host memory 106 of data segments of the data payload.

Next, TCP sequence state machine 204 of FIG. 2 transmits a second download MSS payload signal to DMA control state machine 202 directing it to request a download of a MSS length portion of the data payload from host device 100 to be used to form the second Ethernet frame segment. Upon receiving the second download MSS payload signal, DMA control state machine 202 performs the operations described above in order to determine the length of payload data to request to be downloaded from host device 100. Typically, the requested length of payload data to be downloaded is the MSS length, but there are exception which are described above. Once the download request length is determined, DMA control state machine 202 transmits a second download request signal to the host driver running on processor 104 requesting download of the request length of the data payload, which is the second data payload segment. Subsequently, host device 100 downloads the second data payload segment to MUX 210. TCP sequence state machine 204 causes MUX 210 to allow the second data payload segment to pass through it and be received by byte rotator 212. The operation of byte rotator 212, checksum circuit 214, and TX memory device 216 on the second data payload segment are similar to their operation on the first data payload segment, described above. Therefore, the second frame header and the second data payload segment are stored within TX memory device 216 resulting in the formation of the second Ethernet frame segment.

Segmentation circuit 200 continues to operate in the manner described above until the particular data payload stored within host memory 100 has been TCP segmented and stored within TX memory device 216. A medium access control (MAC) circuit 140 of the present embodiment is coupled to TX memory device 216. MAC circuit 140 retrieves the stored Ethernet frame segments from TX memory device 216 in preparation for transmitting them over network 120. It should be appreciated that MAC circuit 140 arbitrates for use of network 120 and then transmits the Ethernet frame segments over the network 120. It should be further appreciated that MAC circuit 140 can begin to retrieve stored Ethernet frame segments from TX memory device 216 before the particular data payload has been completely TCP segmented and stored within TX memory device 216.

Referring still to FIG. 2, during non TCP segmentation transmissions, segmentation circuit 200 functions differently than its operations described above. Basically, during non TCP segmentation transmissions, DMA control state machine 202 of segmentation circuit 200 controls the download from host device 100 of the particular data to be transmitted over network 120. Subsequently, the downloaded data is stored within TX memory device 216. As described above, MAC circuit 140 retrieves the stored data from TX memory device 216 in preparation for transmitting it over network 120. It should be appreciated that TCP sequence state machine 204 and smart cache 208 do not have a significant role in downloading the non TCP segmented data from host device 100. The downloading of non TCP segmented data from a host device is well known by those of ordinary skill in the art.

Figure 3:
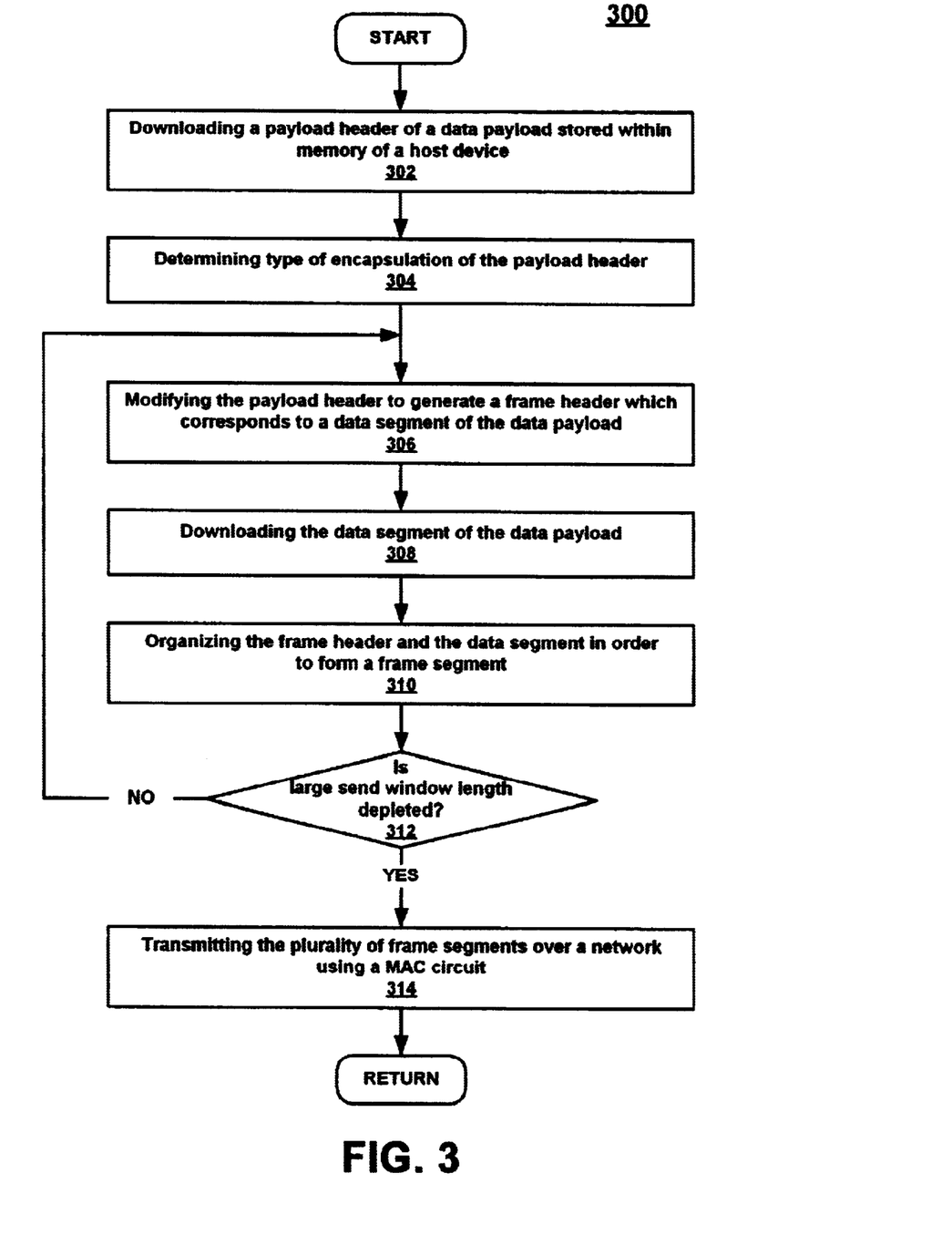
FIG. 3 is a flowchart of steps performed in accordance with one embodiment of the present invention for performing a transmission control protocol (TCP) segmentation process within hardware.

With reference to FIG. 3, a flowchart 300 of steps performed in accordance with one embodiment of the present invention for performing a transmission control protocol (TCP) segmentation process within hardware is shown. Flowchart 300 includes processes of the present invention which, in one embodiment, are carried out by electrical components disposed on a network interface card (NIC) and a processor under the control of computer readable and computer executable instructions. The computer readable and computer executable instructions reside, for example, in data storage features such a computer usable volatile memory 106 and/or computer usable non-volatile memory 108 of FIG. 1. Although specific steps are disclosed in flowchart 300, such steps are exemplary. That is, the present invention is well suited to performing various other steps or variations of the steps recited in FIG. 3.

In step 302, the present embodiment downloads a payload header of a data payload stored within memory of a host device. It should be appreciated that the host device of the present embodiment can be a computer system or any other type of electrical device. Furthermore, the payload header of the present embodiment can include a transmission control protocol (TCP) header field, an internet protocol (IP) header field, and the like.

At step 304, the present embodiment determines type of encapsulation of the payload header. It should be appreciated that the type of encapsulation of the present embodiment can include Ethertype (ETYPE), subnet access protocol (SNAP), virtual local area network Ethertype (VLAN-ETYPE), and virtual local area network subnet access protocol (VLAN-SNAP).

In step 306 of FIG. 3, the present embodiment modifies the payload header in order to generate a frame header which corresponds to a data segment of the data payload. It should be appreciated that at step 306, the present embodiment can generate more or less frame headers than data segments.

At step 308, the present embodiment downloads a data segment of the data payload. One embodiment of step 308, in accordance with the present invention, is implemented in a manner as described above with reference to FIGS. 1 and 2.

In step 310, the present embodiment organizes the frame header and the data segment in order to form a frame segment. It is appreciated that the frame segments of the present embodiment can be Ethernet frame segments.

At step 312 of FIG. 3, the present embodiment determines whether the large send window length has been depleted. If the present embodiment determines at step 312 that the large send window length has been depleted, the present embodiment proceeds to step 314. If the present embodiment determines at step 312 that the large send window length has not been depleted, the present embodiment proceeds to step 306.

It should be appreciated that as long as the large send window length is not depleted, the present embodiment will continue to perform steps 306–310. In this manner, the present embodiment generates a plurality of frame headers corresponding to a plurality of data segments downloaded from the data payload which are organized into a plurality of frame segments.

At step 314, the present embodiment transmits the plurality of frame segments over a network using a medium access control (MAC) circuit. After completing step 312, the present embodiment of flowchart 300 is exited.

Thus, embodiments of the present invention provide a method and system for providing significantly improved data throughput of a network connection which is used with a high speed network (e.g., gigabit levels).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for implementing transmission control protocol (TCP) segmentation within hardware, said method comprising the hardware implemented action of:
   (a) receiving a descriptor from a host device for a data payload stored within host memory to be transmitted over a network;
   (b) utilizing said descriptor to download payload header data of said data payload from said host memory;
   (c) downloading a plurality of data segments of said data payload from said host memory; and
   (d) repeatedly modifying said payload header data in order to generate a plurality of frame headers which correspond to said plurality of data segments.

2. The method for implementing transmission control protocol segmentation within hardware as described in claim 1 further comprising the hardware implemented action of:

(e) organizing said plurality of frame headers and said plurality of data segments in order to form a plurality of frame segments.

3. The method for implementing transmission control protocol segmentation within hardware as described in claim 2 further comprising the hardware implemented action of:

(f) transmitting said plurality of frame segments over said network.

4. The method for implementing transmission control protocol segmentation within hardware as described in claim 1 wherein said host device comprises a computer system.

5. The method for implementing transmission control protocol segmentation within hardware as described in claim 1 wherein said payload header data comprises a transmission control protocol (TCP) header data.

6. The method for implementing transmission control protocol segmentation within hardware as described in claim 1 wherein said payload header data comprises an internet protocol (IP) header data.

7. The method for implementing transmission control protocol segmentation within hardware as described in claim 1 wherein (a), (b), (c) and (d) are performed by circuitry disposed on a peripheral component.

8. The method for implementing transmission control protocol segmentation within hardware as described in claim 1 wherein (a), (b), (c) and (d) are performed by circuitry disposed on a network interface card (NIC).

9. The method for implementing transmission control protocol segmentation within hardware as described in claim 1 further comprising the hardware implemented action of:

(e) determining type of encapsulation of said payload header data.

10. The method for implementing transmission control protocol segmentation within hardware as described in claim 9 wherein said type of encapsulation is Ethertype (ETYPE), subnet access protocol (SNAP), virtual local area network Ethertype (VLAN-ETYPE), or virtual local area network subnet access protocol (VLAN-SNAP).

11. A circuit for implementing transmission control protocol segmentation on a data payload to be transmitted over a network, said circuit comprising:

a first circuit portion coupled to receive a descriptor from a host device for said data payload stored within a host memory to be transmitted over said network, as part of said transmission control protocol segmentation said first circuit portion uses said descriptor to request download of payload header data and data segments of said data payload from said host memory; and a second circuit portion coupled to receive said payload header data and data segments of said data payload from said host memory, wherein said second circuit portion repeatedly modifies said payload header data to generate frame headers which correspond to said data segments.

12. The circuit as described claim 11 wherein said frame headers and data segments form a plurality of frame segments.

13. The circuit as described in claim 12 wherein said plurality of frame segments are transmitted over said network by a medium access control (MAC) circuit.

14. The circuit as described in claim 11 wherein said host device comprises a computer system.

15. The circuit as described in claim 11 wherein said payload header data comprises a transmission control protocol (TCP) header field.

16. The circuit as described in claim 11 wherein said payload header data comprises an internet protocol (IP) header field.

17. The circuit as described in claim 11 wherein said first circuit portion and said second circuit portion are disposed on a peripheral component.

18. The circuit as described in claim 17 wherein said peripheral component comprises a network interface card (NIC).

19. The circuit as described in claim 11 wherein said second circuit portion determines type of encapsulation of said payload header.

20. The circuit as described in claim 19 wherein said type of encapsulation is Ethertype (ETYPE), subnet access protocol (SNAP), virtual local area network Ethertype (VLAN-ETYPE), or virtual local area network subnet access protocol (VLAN-SNAP).

21. A system for implementing transmission control protocol segmentation, said system comprising:

a host device comprising a host memory; and a circuit for implementing transmission control protocol segmentation, said circuit comprising:

a first circuit portion coupled to receive a plurality of data segments of a data payload stored within said host memory; and a second circuit portion coupled to receive payload header data of said data payload stored within said host memory wherein said second circuit portion repeatedly modifies said payload header data in order to generate a plurality of frame headers which correspond to said plurality of data segments.

22. The system as described in claim 21 wherein said plurality of frame headers and said plurality of data segments form a plurality of frame segments.

23. The system as described in claim 22 wherein said plurality of frame segments are transmitted over a network by a medium access control (MAC) circuit.

24. The system as described in claim 21 wherein said host device comprises a computer system.

25. The system as described in claim 21 wherein said payload header data comprises a transmission control protocol (TCP) header data.

26. The system as described in claim 21 wherein said payload header data comprises an internet protocol (IP) header data.

27. The system as described in claim 21 wherein said first circuit portion and said second circuit portion are disposed on a peripheral component.

28. The system as described in claim 27 wherein said peripheral component comprises a network interface card (NIC).

29. The system as described in claim 21 wherein said second circuit portion determines type of encapsulation of said payload header data.

30. The system as described in claim 29 wherein said type of encapsulation is Ethertype (ETYPE), subnet access protocol (SNAP), virtual local area network Ethertype (VLAN-ETYPE), or virtual local area network subnet access protocol (VLAN-SNAP).

* * * * *

UNITED STATES PATENT AND TRADEMARK OFFICE
CERTIFICATE OF CORRECTION

PATENT NO. : 6,643,710 B1  
DATED : November 4, 2003  
INVENTOR(S) : Leslie Thorne, Glen H. Lowe and Gary Takushi

It is certified that error appears in the above-identified patent and that said Letters Patent is hereby corrected as shown below:

<u>Title page,</u>  
Item [75], Inventors, should read:

-- [75]  Inventors:  Leslie Thorne, San Jose, CA (US);  
                 Glen H. Lowe, Union City, CA (US);  
                 Gary Takushi, Milpitas, CA (US) --

Signed and Sealed this

Eighteenth Day of May, 2004

JON W. DUDAS  
*Acting Director of the United States Patent and Trademark Office*